(12) United States Patent
Aston et al.

(10) Patent No.: US 11,545,743 B2
(45) Date of Patent: Jan. 3, 2023

(54) ADDITIVELY MANUFACTURED MESH CAVITY ANTENNA

(71) Applicant: The Boeing Company, Chicago, IL (US)

(72) Inventors: Richard W. Aston, Brea, CA (US); Nicole M. Hastings, Hermosa Beach, CA (US); Manav H. Sanghvi, Hermosa Beach, CA (US); Martin W. Bieti, Tujunga, CA (US); Nicole Diane Schoenborn, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/422,949

(22) Filed: May 24, 2019

(65) Prior Publication Data

US 2020/0373657 A1    Nov. 26, 2020

(51) Int. Cl.
| | | |
|---|---|---|
| *H01Q 1/42* | (2006.01) | |
| *B33Y 10/00* | (2015.01) | |
| *B33Y 80/00* | (2015.01) | |
| *H01Q 9/16* | (2006.01) | |
| *B22F 10/20* | (2021.01) | |

(52) U.S. Cl.
CPC ............. *H01Q 1/425* (2013.01); *B22F 10/20* (2021.01); *B33Y 10/00* (2014.12); *B33Y 80/00* (2014.12); *H01Q 9/16* (2013.01)

(58) Field of Classification Search
CPC .. H01Q 9/04; H01Q 9/16; H01Q 9/20; H01Q 9/26; H01Q 9/28; H01Q 9/32; H01Q 9/36; H01Q 9/44; H01Q 9/285; H01Q 13/12; H01Q 13/24; H01Q 21/205; H01Q 21/24; H01Q 21/26; H01Q 21/062; H01Q 3/26; H01Q 19/108; H01Q 19/10; H01Q 19/17

See application file for complete search history.

(56) References Cited

U.S. PATENT DOCUMENTS

| | | |
|---|---|---|
| 2,478,913 A | 8/1949 | Goldberg |
| 3,597,710 A | 8/1971 | Levy |
| 4,122,446 A | 10/1978 | Hansen |
| 4,668,956 A * | 5/1987 | Mahnad .................. H01Q 9/28 343/789 |
| RE32,485 E | 8/1987 | Yang et al. |

(Continued)

FOREIGN PATENT DOCUMENTS

| | | |
|---|---|---|
| CN | 102361116 A | 2/2012 |
| KR | 1020190044527 A | 4/2019 |
| WO | 2012076994 A1 | 6/2012 |

OTHER PUBLICATIONS

U.S. Patent and Trademark Office, Final Office Action regarding U.S. Appl. No. 15/933,289, dated May 15, 2020, 9 pages.

(Continued)

*Primary Examiner* — Seokjin Kim
(74) *Attorney, Agent, or Firm* — Kolisch Hartwell, P.C.

(57) ABSTRACT

An antenna device is disclosed, including a cavity structure having a floor portion and a perimeter wall portion connected to the floor portion. A dipole structure extends upward from a center region of the floor portion inside the cavity structure. At least one of the wall portion and the dipole structure has an opening small enough relative to an expected radio frequency wavelength to avoid affecting antenna performance.

20 Claims, 6 Drawing Sheets

(56) References Cited

U.S. PATENT DOCUMENTS

| | | | |
|---|---|---|---|
| 5,182,849 | A | 2/1993 | Marco |
| 6,323,819 | B1 | 11/2001 | Ergene |
| 9,496,621 | B2 | 11/2016 | Meschini et al. |
| 9,608,333 | B1 | 3/2017 | Toledo et al. |
| 9,742,069 | B1 | 8/2017 | Hollenbeck et al. |
| 10,355,359 | B1 | 7/2019 | Butscher et al. |
| 10,589,878 | B2 | 3/2020 | Veto et al. |
| 10,751,988 | B1 | 8/2020 | Snyder et al. |
| 2010/0065192 | A1 | 3/2010 | Wilson et al. |
| 2011/0279339 | A1* | 11/2011 | Johnston ............... H01Q 19/10 343/786 |
| 2012/0044119 | A1 | 2/2012 | Libonati et al. |
| 2016/0067740 | A1 | 3/2016 | Voris et al. |
| 2016/0107380 | A1 | 4/2016 | Smoot et al. |
| 2016/0167312 | A1 | 6/2016 | Feinberg et al. |
| 2017/0036783 | A1 | 2/2017 | Snyder |
| 2017/0062925 | A1 | 3/2017 | Sanchez |
| 2017/0159447 | A1* | 6/2017 | Clum .................... F01D 25/30 |
| 2017/0252804 | A1* | 9/2017 | Hanni ................... B22F 10/10 |
| 2017/0361534 | A1 | 12/2017 | Fernandez-Nieves et al. |
| 2018/0021140 | A1 | 1/2018 | Angelini et al. |
| 2018/0083350 | A1* | 3/2018 | Lam ....................... H01Q 9/27 |
| 2018/0087443 | A1 | 3/2018 | Adriany et al. |
| 2018/0184550 | A1 | 6/2018 | Jenkins et al. |
| 2018/0229863 | A1* | 8/2018 | Veto ....................... F17C 1/08 |
| 2018/0258382 | A1 | 9/2018 | Keselowsky et al. |
| 2018/0311733 | A1 | 11/2018 | Zafar et al. |
| 2019/0291186 | A1 | 9/2019 | Aston et al. |
| 2020/0112107 | A1 | 4/2020 | Taptic et al. |
| 2020/0289288 | A1* | 9/2020 | Muller ................. A61F 2/4455 |
| 2020/0373642 | A1 | 11/2020 | Aston et al. |

OTHER PUBLICATIONS

U.S. Patent and Trademark Office, Non-Final Office Action regarding U.S. Appl. No. 15/933,289, dated Sep. 14, 2020, 11 pages.

Huang, Guan-Long et al.,"3-D Metal-Direct-Printed Wideband and High-Efficiency Waveguide-Fed Antenna Array", The Institute of Electrical and Electronics Engineers, Inc. (IEEE) Conference Proceedings, May 1, 2015, p. 1.

Kaddour, Abdul Sattar et al., "3D Printed Compact Dual-Polarized Wideband Antenna", 2017 11th European Conference on Antennas and Propagation (EUCAP), EURAAP Mar. 19, 2017, pp. 3441-3443.

European Patent Office, Extended European Search Report regarding European Patent Application No. 19164587.8, dated Aug. 6, 2019, 10 pages.

U.S. Patent and Trademark Office, Non-Final Office Action regarding U.S. Appl. No. 15/933,289, dated Dec. 5, 2019, 12 pages.

Saucourt, Jeremy et al., "Design of 3D printed plastic modular filters", 2016 46th European Microwave Conference (EUMC), European Microwave Association, Oct. 4, 2016, pp. 369-372.

Peverini, Oscar A. et al., "Selective Laser Melting Manufacturing of Microwave Waveguide Devices", Proceedings of the IEEE, IEEE, New York, US, vol. 105, No. 4, Apr. 1, 2017, pp. 620-631.

Talom, F. Tchoffo et al., "Additive manufacturing form RF microwave devices: Design, performances and treatments improvement evaluations", 2017 International Conference on Electromagnetics in Advanced Applications (ICEAA), IEEE, Sep. 11, 2017, pp. 1473-1476.

Booth, Paul A. et al., "Realizing advanced waveguide bandpass filters using additive manufacturing", IET Microwaves, Antennas & Propagation, The Institution of Engineering and Technology, United Kingdom, vol. 11, No. 14, Nov. 19, 2017, pp. 1943-1948.

Peverini, Oscar A. et al., "Additive manufacturing of Ku/K-band waveguide filters: a comparative analysis among selective-lithography" IET Microwaves, Antennas & Propagation, vol. 11, No. 14, Nov. 19, 2017, pp. 1936-1942.

Salak, Milan et al., "W-Band Waveguide Bandpass Filters Fabricatedby Micro Laser Sintering", IEEE Transactions on Circuits and Systems II: Express Briefs, IEEE, US, vol. 66, No. 1, Jan. 1, 2019, pp. 61-65.

European Patent Office, Extended European Search Report regarding European Patent Application No. 20164010.9, dated Sep. 18, 2020, 12 pages.

European Patent Office, Extended European Search Report regarding European Patent Application No. 20170572.0, dated Oct. 28, 2020, 7 pages.

Lap, Bram, "Design of a Pickett-Potter Horn to measure the CMB at 11 GHz", Kapteyn Astronomical Institute and SRON, Netherlands Institute for Space Research, Jul. 6, 2015, 72 pages.

Bahr, Ryan A. et al., "Novel Uniquely 3D Printed Intricate Voronoi and Fractal 3D Antennas", IEEE, 2017, pp. 1583-1586.

Bjorgaard, Jason et al., "Design and Fabrication of Antennas Using 3D Printing", Progress In Electromagnetics Research C, 2018, vol. 84, pp. 119-134.

U.S. Patent and Trademark Office, Non-Final Office Action regarding U.S. Appl. No. 16/422,939 dated Mar. 15, 2021, 25 pages.

Wang et al., "A Wideband Millimeter-Wave Circularly Polarized Antenna With 3-D Printed Polarizer", IEEE Transactions on Antennas and Propagation, vol. 65, No. 3, Mar. 1, 20217, pp. 1038-1046.

Hindle, Pat, "Antenna Technologies for the Future", Microwave Journal, Jan. 15, 2018, Retrieved from the Internet: URL: https://www.microwavejournal.com/articles/print/29572-antenna-technologies-for-the-future, retrieved on Jul. 27, 2020, 9 pages.

European Patent Office, Examination Report regarding European Patent Application No. 19164587.8, dated Aug. 5, 2020, 8 pages.

European Patent Office, Examination Report regarding European Patent Application No. 19164587.8, dated Mar. 5, 2021, 7 pages.

Huang, Guan-Long et al., "Lightweight Perforated Waveguide Structure Realized by 3-D Printing for RF Applications", IEEE Transaction on Antennas and Propagation, IEEE, USA, vol. 65, No. 8, Aug. 1, 2017, pp. 3897-3904.

European Patent Office, Extended European Search Report regarding European Patent Application No. 21199091.6, dated Feb. 10, 2022, 9 pages.

European Patent Office, Examination Report regarding European Patent Application No. 19164587.8, dated Feb. 2, 2022, 6 pages.

European Patent Office, Examination Report regarding European Patent Application No. 20170572.0, dated Jun. 17, 2022, 8 pages.

* cited by examiner

ADDITIVELY MANUFACTURED MESH CAVITY ANTENNA

FIELD

This disclosure relates to systems and methods for radio signal communication. More specifically, the disclosed examples relate to antennas and antenna components.

INTRODUCTION

Antennas are a key element of radio communications technology, for transmitting and/or receiving radio signals. The conductive material of an antenna serves as an interface between electric currents in a communicator circuit and radiated electromagnetic waves. Geometry and material of the antenna determine properties such as impedance, directionality, and bandwidth. Preferable properties depend on the intended location and application of the antenna, which may vary widely. For example, consumer frequency modulation (FM) radios may use a monopole omnidirectional antenna appropriate to receiving signals from any direction, whereas Global Positioning System (GPS) satellites may use a highly directional antenna for earth directed transmission. For many applications, complex geometry must be executed with high precision to produce an effective antenna. Such antennas are conventionally manufactured by hand assembly of multiple individually machined parts, a slow and expensive process.

Additive Manufacturing (AM) is quickly gaining popularity in many industries as a method of rapid production at relatively low cost. AM, sometimes known as 3D printing, can be used to create a solid object from a 3D model by building the object incrementally. AM typically applies a raw material that is then selectively joined or fused to create the desired object. The raw material is typically applied in layers, where the thickness of the individual layers can depend upon the particular techniques used.

Often, the raw material is in the form of granules or powder, applied as a layer and then selectively fused by a heat source. In many cases, the upper surface of a bed of such material is fused, and the growing workpiece is then lowered slightly. A fresh layer of raw material is then applied to the bed, and the next layer is fused onto the previous one. The granular raw material may include for example thermoplastic polymer, metal powder, metal alloy powder, or ceramic powder, which may be fused using a computer-controlled heat source, such as a scanning laser or scanning electron beam. Exemplary methods include selective laser melting (SLM), direct metal laser sintering (DMLS), selective laser sintering (SLS), fused deposition modelling (FDM), and electron beam melting (EBM), among others.

Conventional part designs used for machining or other subtractive manufacturing may be inefficient or even unworkable for AM. Depending on the process and material used, unsupported features may collapse, delicate features may be rendered with insufficient clarity, and/or warping and cracking may occur. New designs maintaining functionality of conventional parts while enabling efficient use of AM methods are needed.

SUMMARY

The present disclosure provides systems, apparatuses, and methods relating to antenna devices and components. In some examples, an antenna device may include a cavity structure having a floor portion and a perimeter wall portion connected to the floor portion. A dipole structure may extend upward from a center region of the floor portion inside the cavity structure. At least one of the wall portion and the dipole structure may have an opening small enough relative to an expected radio frequency wavelength to avoid affecting antenna performance.

In some examples, an antenna device may include an additively manufactured cup structure and an additively manufactured dipole structure. The cup structure may have a floor portion and a perimeter wall portion connected to the floor portion. The dipole structure may extend upward from the floor portion. At least one of the wall portion and the dipole structure may include an additively manufactured mesh.

In some examples, a method of manufacturing a cavity antenna may include printing a cavity structure having a floor portion and a perimeter wall portion. The method may further include printing a dipole structure inside the cavity structure. At least one of the cavity structure and the dipole structure may include a mesh.

Features, functions, and advantages may be achieved independently in various examples of the present disclosure, or may be combined in yet other examples, further details of which can be seen with reference to the following description and drawings.

DETAILED DESCRIPTION

Various aspects and examples of an antenna component having a cup structure, as well as related methods of manufacture are described below and illustrated in the associated drawings. Unless otherwise specified, an antenna component and/or its various subcomponents may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview

In general, an antenna device or antenna component may include an additively manufactured structure. The antenna component may be configured to facilitate sending and/or receiving radio signals, and may include a conductive material. The conductive material may comprise some or all of the additively manufactured structure and/or may be applied to the additively manufactured structure. The antenna component may function as part of a conventional antenna such as a command horn, cup dipole, or waveguide antenna. The antenna component may additionally or alternatively function as an antenna without additional components.

Figure 1:
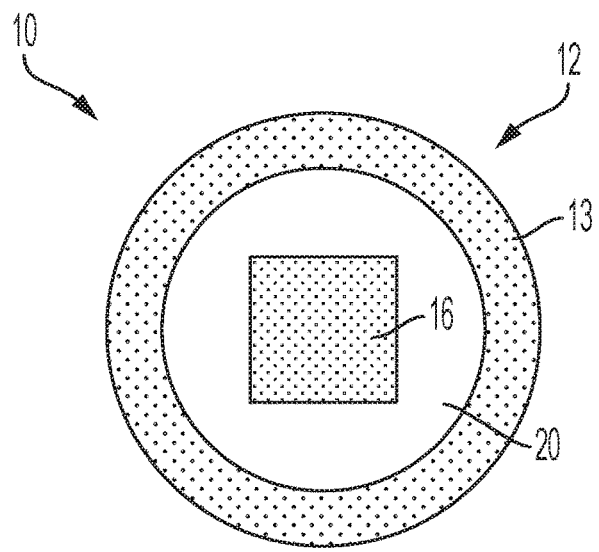
FIG. 1 is a schematic diagram of an illustrative antenna device in accordance with aspects of the present disclosure.

FIG. 1 is a schematic diagram of an antenna component indicated at 10, having a cavity portion 12 with a perimeter wall 13 and a floor 20. The cavity portion may be described as tubular, cylindrical, and/or hollow. In FIG. 1, cavity portion 12 is depicted as circular in cross-section, but may include any appropriate cross-sectional shape. The cavity portion may be configured to form a channel or resonator for sending or receiving radio frequency signals, and/or may be configured to direct radio frequency signals.

Antenna component 10 further includes an internal structure 16. The internal structure may have any geometry configured to facilitate transmission and/or reception of radio frequency electromagnetic waves. Internal structure 16 may extend up from floor 20, and/or may be formed on other portions of antenna component 10. For example, the internal structure may be a crossed dipole extending up from a central region of the floor. Internal structure 16 may be configured for a selected polarization, resonant frequency band, radiation pattern, and/or any functional antenna properties. Wall 13 may also have an inner geometry configured for a selected polarization, resonant frequency band, radiation pattern, and/or any functional antenna properties.

Antenna component 10 includes a conductive material, which may be a laser sintered metal. In some examples, the component may include aluminum, copper, titanium, and/or an alloy thereof. The component may include multiple materials, or may be produced from a single material. Conductivity, elasticity, density, and temperature sensitivity, along with other factors, may be considered in selecting a material or combination of materials for antenna component 10. Appropriate or desirable materials may depend on an intended application of the antenna component, and a selected additive manufacturing method.

Figure 2:
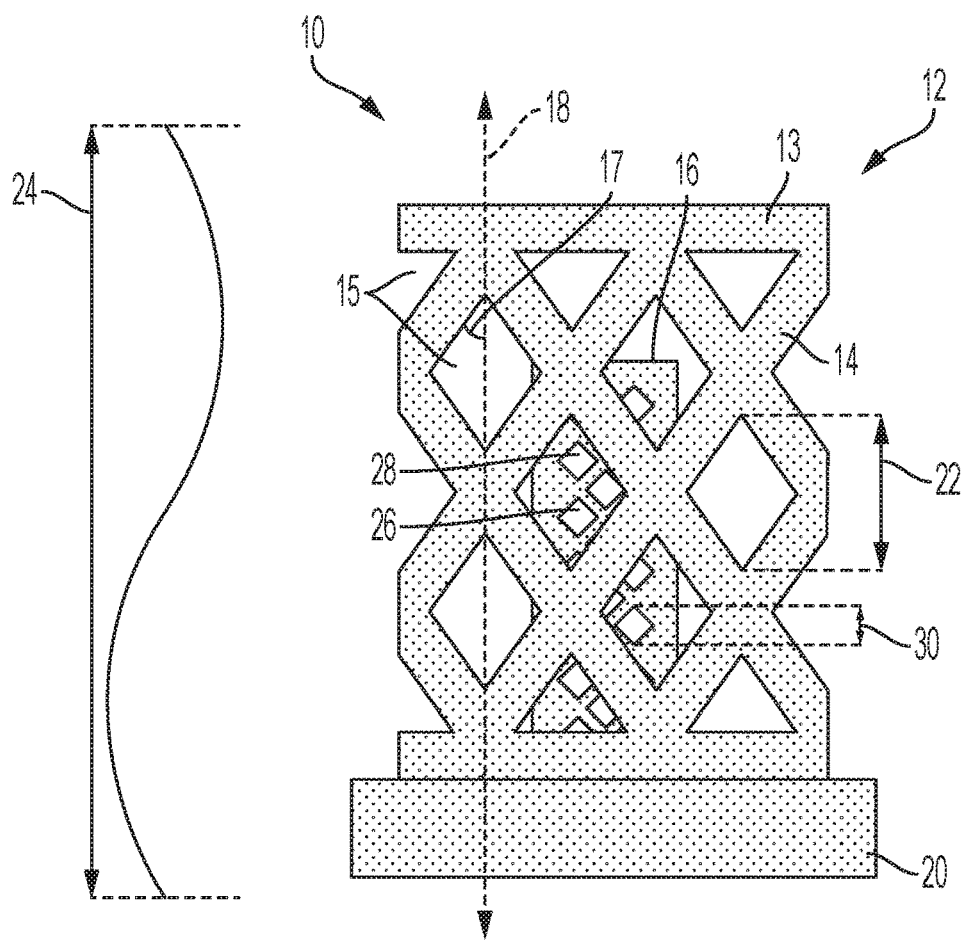
FIG. 2 is a schematic diagram of the mesh of the antenna device of FIG. 1, and an illustrative radio signal.

Antenna component 10 has a manufacturing orientation defined by a vertical axis 18, which may be parallel to a central axis of cavity portion 12. The vertical axis is depicted in FIG. 2. The component may comprise a plurality of layers, each layer being generally perpendicular to vertical axis 18. Each layer may be thin and planar, and fused to or otherwise cohesive with adjacent layers.

Variation from one layer to an adjacent layer may be limited. That is, dimensions of antenna component 10 may change gradually along vertical axis 18. The antenna component may include no abrupt overhangs, where an abrupt overhang may be described as any downward-facing surface forming an angle of greater than approximately 45 degrees or greater than approximately 50 degrees with vertical axis 18. All features of antenna component 10 may therefore be printed without need for secondary supports.

In some examples, antenna component 10 may be post-processed from an additively manufactured blank. Abrupt overhangs or other features inappropriate to additive manufacture may be machined. In such examples, the additively manufactured blank may include no abrupt overhangs and may be printed without use of secondary supports.

Thickness of any structure of antenna component 10 may be bounded. In other words, the thickness may have an upper and/or a lower limit. Each layer of the antenna component may have limited area for any structure. The limit may be absolute or relative. For example, wall 13 of cavity portion 12 may be limited to a thickness of less than 60 thousandths of an inch ("mils"), where 1 mil=0.001 inch ("), or the wall 13 may be limited to 6% of a diameter of the cavity portion. Such restriction may prevent cracking or tearing of printed material due to stresses introduced in the manufacturing process and/or in subsequent cooling or other temperature fluctuation.

For another example, wall 13 may be restricted to a thickness of more than 20 mils. Such restriction may help to produce a desired print resolution and features of sufficient strength to maintain geometric integrity through the additive manufacturing process.

As shown schematically in FIG. 2, perimeter wall 13 includes a mesh 14. The mesh may be described as including a plurality of apertures or openings 15. The mesh may also be described as a regular array of openings, a lattice, and/or a first plurality of parallel linear structures intersecting a second plurality of parallel linear structures. In the depicted example, openings 15 are diamond shaped or triangular and regularly spaced around wall 13, which may help to maintain the circular shape of cavity portion 12 through additive manufacture of antenna component 10. Mesh 14 may be configured to maintain any desired shape of wall 13. Mesh 14 may also be configured to facilitate a stable geometry of antenna component 10 and reduce warping and/or thermal distortion during a manufacturing process. The antenna component may thereby have low geometric profile deviations from a Computer Aided Design (CAD) nominal specification.

Openings 15 may be shaped to allow mesh 14 to be additively manufactured without use of secondary supports. In the depicted example, each side of each diamond shaped or triangular opening forms an angle 17 with vertical axis 18. Angle 17 may be less than approximately 45 degrees or less than approximately 50 degrees. In other words, each linear structure defining the openings may form an angle with vertical axis 18 of less than approximately 45 degrees or less than approximately 50 degrees.

Each opening 15 may have a maximum dimension 22. The maximum dimension may also be described as a greatest opening width of the opening. For the depicted diagonal openings, this dimension is between opposing corners. For a circular opening the maximum dimension would be a diameter of the circle. Antenna component 10 may be configured for transmission and/or receipt of radio signals within a range of wavelengths. Such a radio wave is schematically depicted in FIG. 2, not to scale. Maximum dimension 22 of each opening 15 is limited relative to a smallest expected wavelength 24.

Limiting maximum dimension 22 may ensure that openings 15 have a negligible impact on the electromagnetic properties of antenna component 10. For example, maximum dimension 22 may be less than ten percent of wavelength 24. Maximum dimension 22 may be selected such that the impact of openings 15 on antenna component is below a selected acceptable threshold. Smaller openings may decrease the effect of the openings, and openings 15 may be sized small enough relative to expected wavelength 24 to avoid affecting antenna performance. In some examples, the maximum dimension may be less than five percent, or less than 2 percent of the expected wavelength.

Openings 15 may also be sized and/or spaced according to structural requirements of antenna component 10. That is, openings 15 may be configured such that mesh 14 has sufficient structural strength, stiffness, or other desired structural properties. In some examples, floor 20 may also include a mesh and/or openings.

Inclusion of mesh 14 in cavity portion 12 may decrease an overall volume of material used to additively manufacture the antenna component 10. Such a decrease may in turn reduce material cost, manufacturing time, and weight of the component. Mesh 14 may also reduce surface area of cavity portion 12, thereby reducing susceptibility of antenna component 10 to vibration and acoustic effects.

Internal structure 16 may additionally or alternatively include a mesh 26. The mesh may include one or more openings 28. Each opening may have a maximum dimension 30, limited relative to expected wavelength 24. Similarly to openings 15 as detailed above, openings 28 may be sufficiently small relative to the expected wavelength that the openings have a negligible impact on the electrodynamic properties of antenna component 10. Maximum dimension 30 may differ from maximum dimension 22. Openings 28 may have matching or differing shape and/or pattern to openings 15. Openings 28 may also be limited by structural requirements of internal structure 16, particularly for small or delicate structures such as a dipole.

In some examples, one or more portions of antenna component 10 may be described as out of the signal path of the antenna. Such portions may include a mesh and/or openings of any structurally appropriate configuration. That is, the size of openings in such portions may be limited according to structural considerations and not an expected wavelength.

Floor 20 of cavity portion 12, or other portions of antenna component 10, may be configured for connection to an electronic circuit. For example, the antenna component may include openings appropriate for attaching coaxial adaptors. The antenna component may also be configured for connection to other antenna components, such as a reflector dish or protective cover. In some examples, antenna component 10 may be designed to have an equivalent functionality as an existing antenna design and may be configured to connect to a generally matching electrical system as the existing antenna design. For example, antenna component 10 may be designed to have an impedance matching network to an existing conventional antenna design.

Antenna component 10 may be partially or entirely unitary. In other words, wall 13, mesh 14, internal structure 16, floor 20, and/or any other portions of the antenna component may comprise a single structure. The antenna component may be additively manufactured in one process, without need for assembly of separate parts. The antenna component may also be manufactured without secondary supports that require removal after manufacture.

Antenna component 10 may have improved reliability, as a result of unitary construction. Failure modes related to connection or interaction of parts may be eliminated. For example, the antenna component may not include bolts that may loosen under vibration, shims that shift under load, or tuning screws that alter tuning during transportation. Generally, potential for operational complications may be reduced for an antenna comprising fewer components.

Antenna component 10 may have a geometry configured to be repeatable. In other words, the geometry of the antenna component may be such that when multiple copies of the component are manufactured, each copy measures within a desired tolerance of the original design. In some examples, the desired tolerance may be 1 mil, may be 10 mil, or may be any appropriate size. Manufactured copies may also be true to shape. For example, an opening designed to be circular may be consistently printed as circular and not elliptical.

EXAMPLES, COMPONENTS, AND ALTERNATIVES

The following sections describe selected aspects of exemplary antenna devices and antenna components as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative L-Band Cup Dipole Antenna

As shown in FIGS. 4-8, this section describes an additively manufactured cup dipole antenna, generally indicated at 110. Antenna 110 includes an antenna framework 112, which is an example of additively manufactured antenna component 10, as described above. The cup dipole antenna may also be described as a turnstile antenna, or a crossed dipole antenna.

Figure 3:
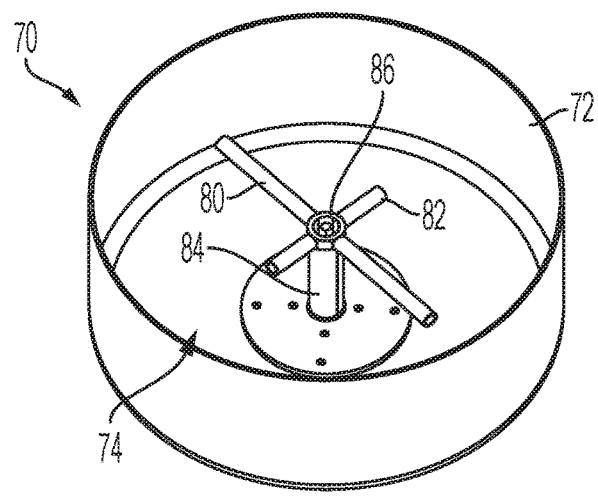
FIG. 3 is an isometric view of an illustrative conventionally manufactured cup dipole antenna as described herein.

FIG. 3 shows a design for a conventional, subtractively manufactured cup dipole antenna, generally indicated at 70. Conventional antenna 70 comprises a plurality of separately machined components, each screwed, bonded, or otherwise fixed together. The antenna includes a generally cylindrical, conductive cup 72 with a central opening. A dipole structure 74 is fastened inside the cup 72, over the opening, with a gasket. Dipole structure 74 includes two dipoles disposed perpendicular to each other, a longer dipole 80 and a shorter dipole 82. The dipoles are mounted on a split-tube balun 84, which includes a separate conductor 86 that must be installed in the balun. The balun is configured to transform the unbalanced signal from a connected coaxial cable to a balanced signal of appropriate impedance.

Longer dipole 80 and shorter dipole 82 are of lengths selected to tune antenna 70 to a selected frequency band, and of appropriate relative length to result in phase quadrature between the two dipoles. Antenna 70 is therefore circularly polarized. Cup 72 is configured to act as a resonant cavity, and to direct radio frequency signals. Dimensions and positioning of each component of conventional antenna 70 are calculated to result in desired functional properties of the antenna, such as polarization, resonant frequency, and directionality. However, some surfaces and structures of conventional antenna 70 are critical to the electromagnetic properties of the antenna, while others are structurally and mechanically important.

Additively manufactured antenna 110 may be configured to retain the electromagnetically and functionally critical features of conventional antenna 70, with alterations to structural and mechanically important features to enable additive manufacture. Antenna 110 may also alter electromagnetically critical features such as the length of the crossed dipoles to maintain equivalent functionality despite consequences of structural changes, such as changes to reactance of the dipoles due to increased area.

Figure 4:
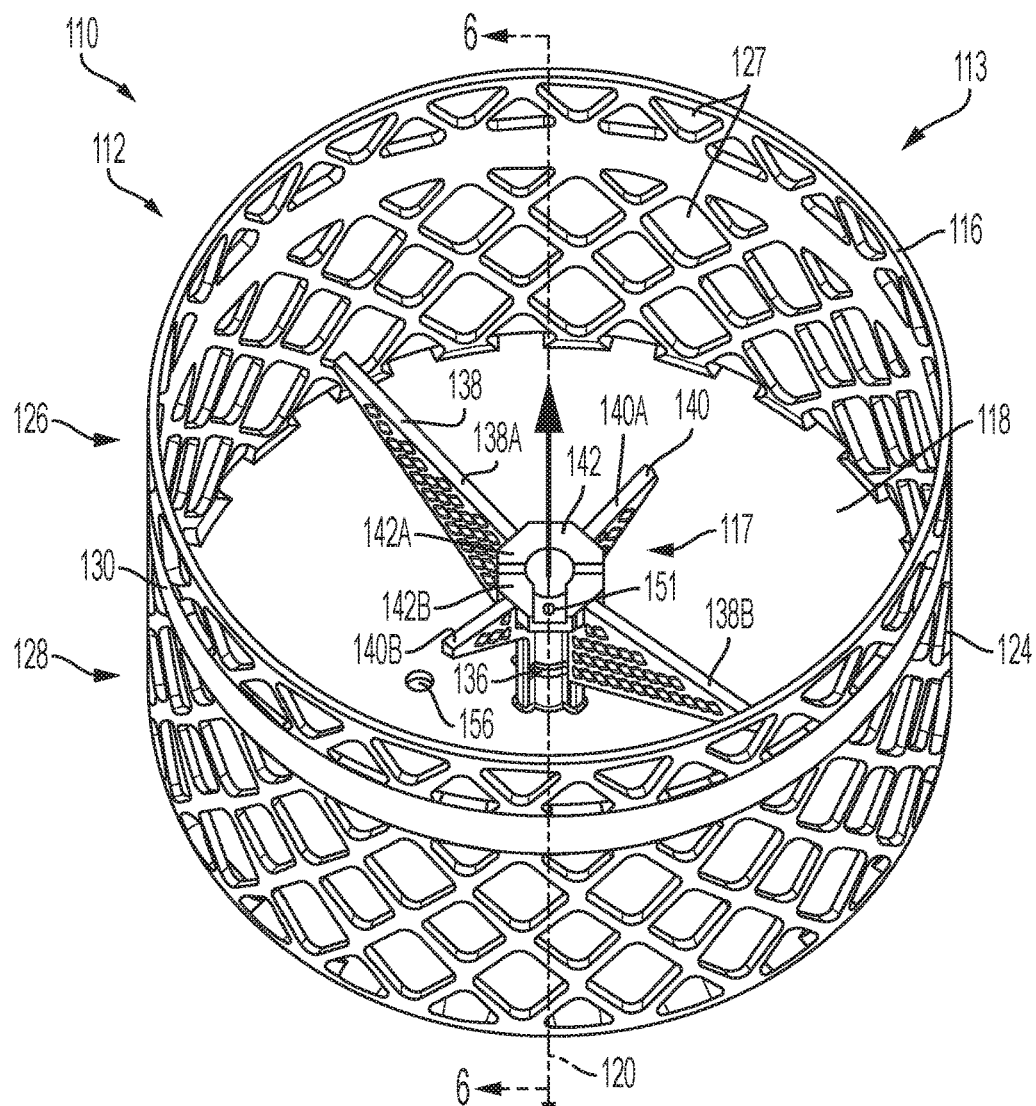
FIG. 4 is an isometric view of an illustrative additively manufactured cup dipole antenna in accordance with aspects of the present disclosure.

As shown in FIG. 4, antenna framework 112 of antenna 110 is unitary. That is, the antenna framework is a single piece, reducing overall assembly required for antenna 110. Single piece antenna framework 112 may also improve reliability of antenna 110 and/or reduce failure modes for the antenna.

The antenna is configured for manufacture without secondary supports. In other words, no support structures need to be removed after manufacture of the antenna. The depicted example of antenna framework 112 requires limited post-processing in the form of machining detailed features such as a balun and a bottom surface, as described in greater detail below. The antenna may be configured such that surface roughness resulting from manufacture is limited sufficiently that overall surface finishing is not needed.

Antenna 110 may be configured for manufacture by Direct Metal Laser Sintering (DMLS). The antenna comprises a sintered aluminum alloy, specifically AlSi10Mg Type II in the present example. The alloy may provide good strength, hardness, and high load tolerance, along with low weight. Any metal or alloy of similarly appropriate properties may be used, in any effective additive manufacturing process.

Antenna 110 is configured for radio communication within a frequency band. That is, the antenna is tuned to a range of radio frequencies. In the depicted example, antenna 110 is tuned to the L-band, which includes wavelengths between approximately 11.8 to 5.9 inches (30 to 15 centimeters).

Figure 6:
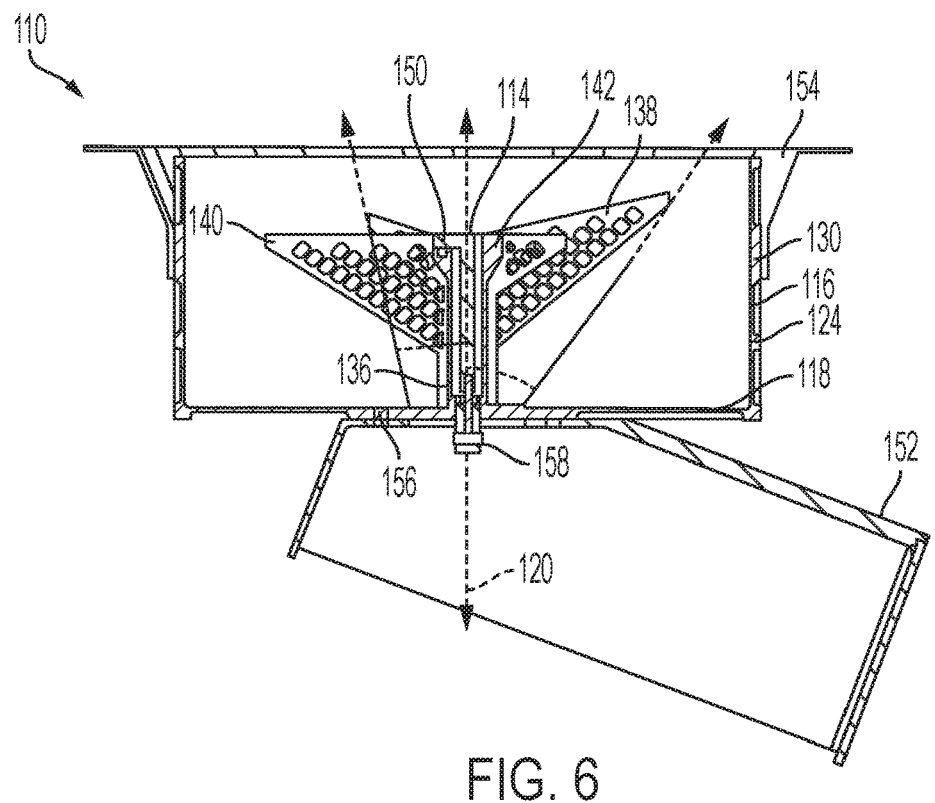
FIG. 6 is a cross-sectional view of the antenna of FIG. 4, along line 6-6 and further including mounting accessories.

Antenna 110 includes antenna framework 112 and a conductive core 114 (see FIG. 6). Antenna framework 112 comprises a cup 113 and an inner dipole structure 117, the cup including an outer wall 116 and a circular base 118. Cup 113 may form a circular radiating aperture for antenna 110. The cup may also be described as a tubular structure, and/or a hollow cylinder closed at one end.

Cup 113 may be approximately 7 inches in diameter, 7.5 inches in diameter, or between 6 and 8 inches in diameter. The cup may be approximately 4 inches in height, approximately 4.5 inches in height, or between 3 and 5 inches in height. An internal height of cup 113 may correspond to a selected wavelength. Dimensions of cup 113 may also be determined by desired functional properties of antenna 110.

Antenna framework 112 has a central axis 120, on which cup wall 116 is centered. Central axis 120 may be described as determining a manufacturing orientation of antenna framework 112. When the antenna framework is manufactured, central axis 120 may be parallel to a vertical or z-axis of the manufacturing equipment. Antenna framework 112 may consequently comprise a plurality of planar layers that are perpendicular to central axis 120.

Cup wall 116 is primarily formed of a mesh 124, which includes a plurality of openings 127. The mesh may also be described as a lattice structure, a framework, and/or a plurality of apertures in wall 116. In some examples, cup base 118 may also be partially or entirely formed of a mesh.

Openings 127 include diamond shapes and half-diamond or triangular shapes. In some examples, the openings may include other polygonal shapes or self-supporting non-polygonal shapes such as teardrops. Mesh 124 is an example of mesh 14 as described above. Openings 127 are regularly spaced around wall 116 and oriented such that sides of the apertures form an angle of no more than approximately 45 degrees with central axis 120. Openings 127 may also be described as defined between a plurality of intersecting linear structures, each linear structure forming an angle of no more than approximately 45 degrees with central axis 120. In examples where cup base 118 includes a mesh, openings of that mesh may not be constrained to polygonal shapes and/or to angles relative to central axis, due to the orientation of cup base 118 perpendicular to the manufacturing orientation of the antenna framework.

A thickness of mesh 124, which may be also be referred to as thickness of wall 116, may be approximately 45 mils, may be between 40 and 50 mils, or may be between 20 and 60 mils. The diamond shapes and regular pattern of openings 127 may stiffen and reinforce the thin outer wall, improving structural strength. The shape and pattern of openings may also be configured to maintain the circular shape of cup 113 and thereby circularity of the aperture of antenna 110.

Openings 127 may be sized to ensure a negligible impact on the electromagnetic properties of the antenna. In other words, openings 127 may be sized small enough relative to expected wavelengths to avoid affecting antenna performance. In some examples, a maximum dimension of the openings may be selected such that changes to properties of the antenna such as gain are below a selected acceptable threshold.

Openings 127 may also be sized, shaped, spaced, and/or arranged according to structural requirements of antenna component 10. That is, openings 127 may be configured such that mesh 124 has sufficient structural strength, stiffness, or other desired structural properties.

In the depicted example, cup wall 116 is divided into an upper section 126 of mesh and a lower section 128 of mesh, separated by a cover coupling ring 130. The cover coupling ring 130 is a smooth surface without openings, having an equal or greater thickness as compared to mesh 124. A bottom edge of the ring may be chamfered at approximately a 45 degree angle. The smooth surface of cover coupling ring 130 may be configured for effective bonding of an adhesive. In some examples, the ring may include recesses, grooves, or other features configured to facilitate connection to an antenna cover.

Figure 5:
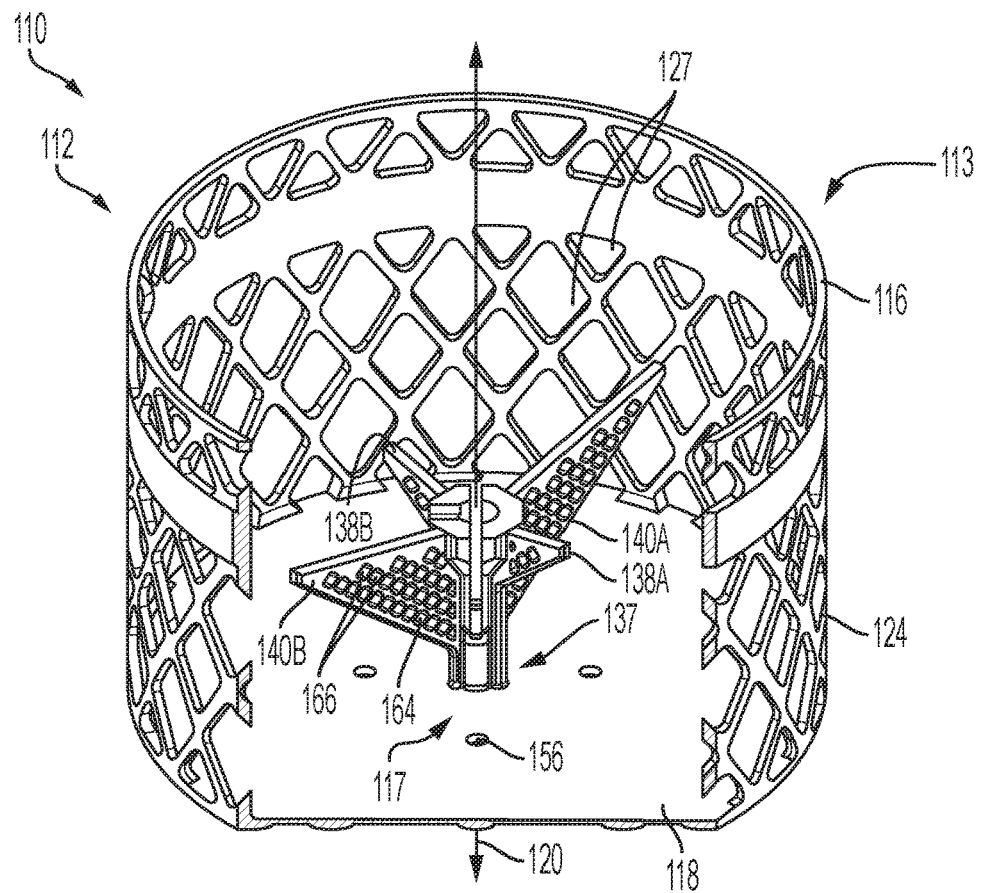
FIG. 5 is a cutaway isometric view of the antenna of FIG. 4.

As shown more clearly in FIG. 5, dipole structure 117 of antenna framework 112 includes a long dipole 138 and a short dipole 140, each connected to a balun tube 136. Balun tube 136 is cylindrical, with an octagonal flange 142 at a top end. The balun tube is hollow, having a central circular cavity aligned with a central circular aperture of cup base 118. Balun tube 136 extends up from a center region 137 of cup base 118, and is joined to the cup base. The balun tube may be described as centered on or coaxial with central axis 120 of antenna framework 112. Octagonal flange 142 may be chamfered, and/or filleted, such that the flange does not extend out perpendicularly from an outer surface of balun tube 136. In the depicted example, the intersection of octagonal flange 142 and the outer surface of balun tube 136 is beveled at approximately 45 degrees.

Long dipole 138 includes a first pole 138A and a second pole 138B, each of which is planar or sheet-shaped and extends from balun tube 136. Short dipole 140 includes a first pole 140A and a second pole 140B, each of which is planar or sheet-shaped and extends from balun tube 136. First and second poles 138A, 138B are parallel, coplanar, coextensive, and of matching dimensions. First and second poles 140A, 140B are similarly parallel, coplanar, and coextensive, but of differing dimensions. In the depicted example, all four poles have a matching thickness. Each pole of long dipole 138 is perpendicular to each pole of short dipole 140.

Each pole 138A, 138B, 140A, 140B has a generally triangular shape, with a squared outer corner. Lengths of the poles may be chosen to achieve a desired phase difference between signals in long dipole 138 and short dipole 140. Specifically, the lengths may be chosen to achieve phase quadrature and thus circular polarization of antenna 110.

Each pole 138A, 138B, 140A, 140B includes a mesh 164. The mesh of the poles includes a plurality of apertures or openings 166. Similarly to openings 127 of mesh 124 as described above, openings 166 are also sized for operation of antenna 110 in the L-band of radio frequencies.

However, as shown in FIG. 5, openings 166 have a different size and shape compared to openings 127 of mesh 124. More specifically, openings 166 have a square shape and measure approximately one tenth of an inch on the diagonal. Openings 166 are sized according to structural requirements of dipoles 138, 140. As the dipoles are smaller structures than cup wall 116, mesh 164 is finer to maintain structural strength of the poles. That is, openings 166 of mesh 164 are configured such that internal dipole structure 117 has sufficient structural strength and stiffness.

Figures 7, 8:
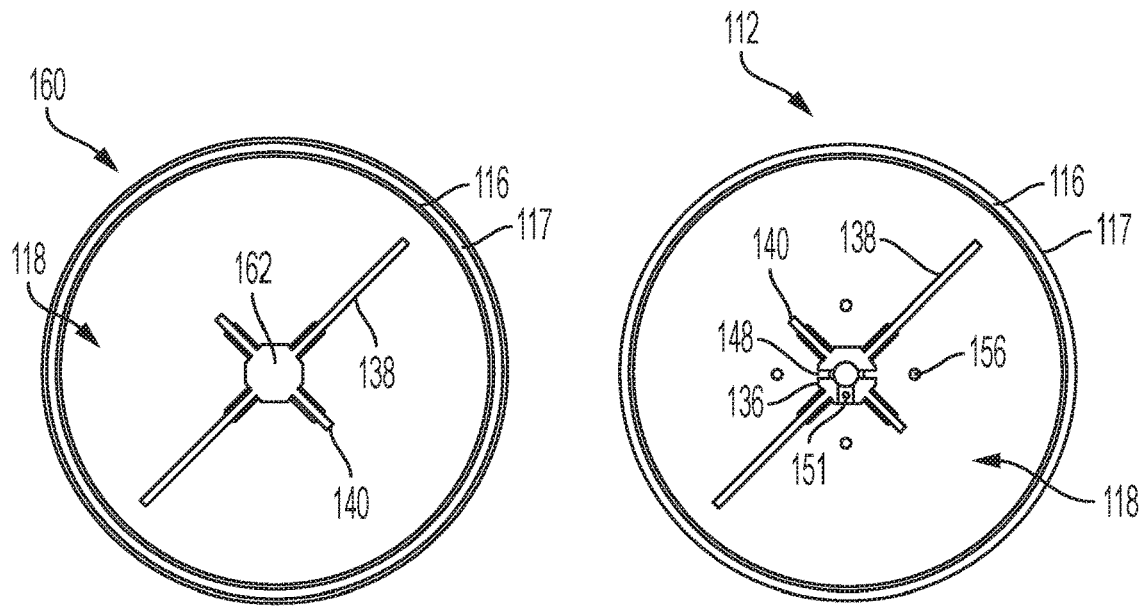
FIG. 7 is a top view of an illustrative additively manufactured blank for the antenna of FIG. 4, as described herein.
FIG. 8 is a top view of the antenna of FIG. 4.

Balun tube 136 is configured to act as a split sheath balun in cooperation with the conductive core of the antenna, and transform an unbalanced signal from a connected coaxial cable to a balanced signal of appropriate impedance. Two slots 148, as shown in FIG. 8, extend vertically through balun tube 136, from octagonal flange 142 down toward cup base 118. Slots 148 may have a length less than a height of balun tube 136, and an upper portion of the balun tube may be split by the slots. The length of slots 148 may be chosen to match out the reactance of dipoles 138, 140. The slot length may also be proportional or correspond to a selected wavelength. In some examples, slots 148 may extend the full height of balun tube 136, and the tube may comprise two separate structures, each joined to cup base 118.

Octagonal flange 142 is divided into an unconnected portion 142A and a connected portion 1426. Poles 138A and 140A are joined to unconnected portion 142A, while poles 138B and 140B are joined to connected portion 142B. When a conductive core 114 is installed in antenna framework 112, as shown in FIG. 6, unconnected portion 142A does not contact the conductive core, and the core is fastened to connected portion 142B by a tab 150.

Core tab 150 rests in a recess 151 of octagonal flange connected portion 142B, shown in FIG. 4, that is shaped to snugly receive the tab. An aperture in the core tab aligns with a threaded aperture in recess 151 that is configured to receive a fastener. The conductive core may be thereby mechanically fixed to antenna framework 112 by a fastener. In some examples, the core tab may be bonded or otherwise attached to antenna framework 112.

As shown in FIG. 6, conductive core 114 extends down from core tab 150, through the hollow interior of balun tube 136, without contacting the tube. Conductive core 114 may also connect to antenna framework 112 in any electrically equivalent and effective manner. The conductive core may be manufactured separately from antenna framework 112, and may be conventionally or additively manufactured. Conductive core 114 may comprise the same material as antenna framework 112, may comprise the same alloy of aluminum, or may comprise any appropriate conductive material.

In FIG. 6, antenna 110 is shown in a mounted configuration, including a mounting bracket 152 and a sunshade 154. Sunshade 154 extends over the open end of cup 113 and is configured to shield the antenna 110 from solar radiation. The sunshade is bonded to the cover coupling ring 130. Sunshade 154 may comprise an insulating and/or reflective material and may be manufactured separately to antenna 110.

Mounting bracket 152 may be part of, or fastened to, a structure to which antenna 110 is mounted. For example, mounting bracket 152 may form part of an outer housing of a communications satellite. Cup base 118 includes fastener holes configured for attachment to mounting bracket 152. In the present example, cup base 118 includes four fastening/fastener holes 156 which may be seen more clearly in FIG. 5. Fastener holes 156 align with corresponding holes on mounting bracket 152 to receive fasteners, not shown. Cup base 118 or other components of antenna 110 may include any features configured for attaching antenna 110 to mounting bracket 152 and/or other structures.

FIG. 6 further depicts a coaxial connector 158, extending through the central aperture of cup base 118 into balun tube 136. The connector is configured to interface with conductive core 114 at a first end, and a coaxial cable at a second end. Any effective connector may be used. In the present example, a pin of the connector is threaded into a recess in conductive core 114. Coaxial connector 158 is also supported by interface with cup base 118 and balun tube 136. In the present example, inner surfaces of balun tube 136 and cup base 118 are threaded and engage threading on connector 158. In some examples, connector 158 may be bonded to cup base 118 or may be fixed in any effective manner.

FIG. 7 is a top view of an example of an additively manufactured blank 160 for antenna framework 112. The blank may be machined, drilled, or otherwise post-processed to produce antenna framework 112, as shown in FIG. 8. Features of antenna framework 112 included in the blank may be referred to as printed features, and features produced during post-processing may be referred to as finished features.

Blank 160, as shown in FIG. 7, includes a solid central core 162. Dipoles 138, 140 and beveled octagonal flange 142 are printed features, but features of balun tube 136 are finished. In other words, solid core 162 is machined to produce balun tube 136 as described above and shown in FIG. 8. The solid core 162 is hollowed out and slots 148 are cut. A bottom end of balun tube 136, proximate cup base 118, may also be tapped to produce threads. Recess 151 is machined into octagonal flange 142, and a threaded hole drilled and tapped into the recess.

Cup base 118 is printed as a solid structure with a planar surface. The central aperture of cup base 118 and fastener holes 156 are drilled through the cup base. Either or both of the central aperture and fastener holes may also be tapped to produce threads. The cup base may be printed thicker than desired for antenna framework 112, by approximately 50 mils. This material may allow the printed body to be machined off of a printer base or support plate. A pattern of recesses, such as a wagon-wheel shape, may also be machined into a bottom surface of cup base 118. The recesses may serve to reduce weight of antenna framework 112 while maintaining and/or improving structural properties of cup base 118 such as stiffness and strength.

Mesh 124 of cup wall 116 and mesh 164 of dipoles 138, 140 are printed features of blank 160. That is, blank 160 includes openings 127, 166. The openings do not need to be machined into the cup wall or dipoles, and meshes 124, 164 may be left as-printed without machining or other post-processing.

Cover coupling ring 130 of cup wall 116, shown in FIGS. 4 and 5, may be machined to achieve a smooth surface appropriate for bonding. The ring as printed may include an additional 50 mils of material to be machined off. As printed, the cover coupling ring may be raised 70 mils relative to mesh 124. After machining, the ring may remain 10 mils raised relative to the mesh. This distance may serve to protect mesh 124 during the machining process and prevent undesirable alteration to the mesh. Machining cover coupling ring 130 may result in a smooth surface, which may facilitate bonding of a sunshade as described above.

B. Illustrative S-Band Cup Dipole Antenna

Figure 9:
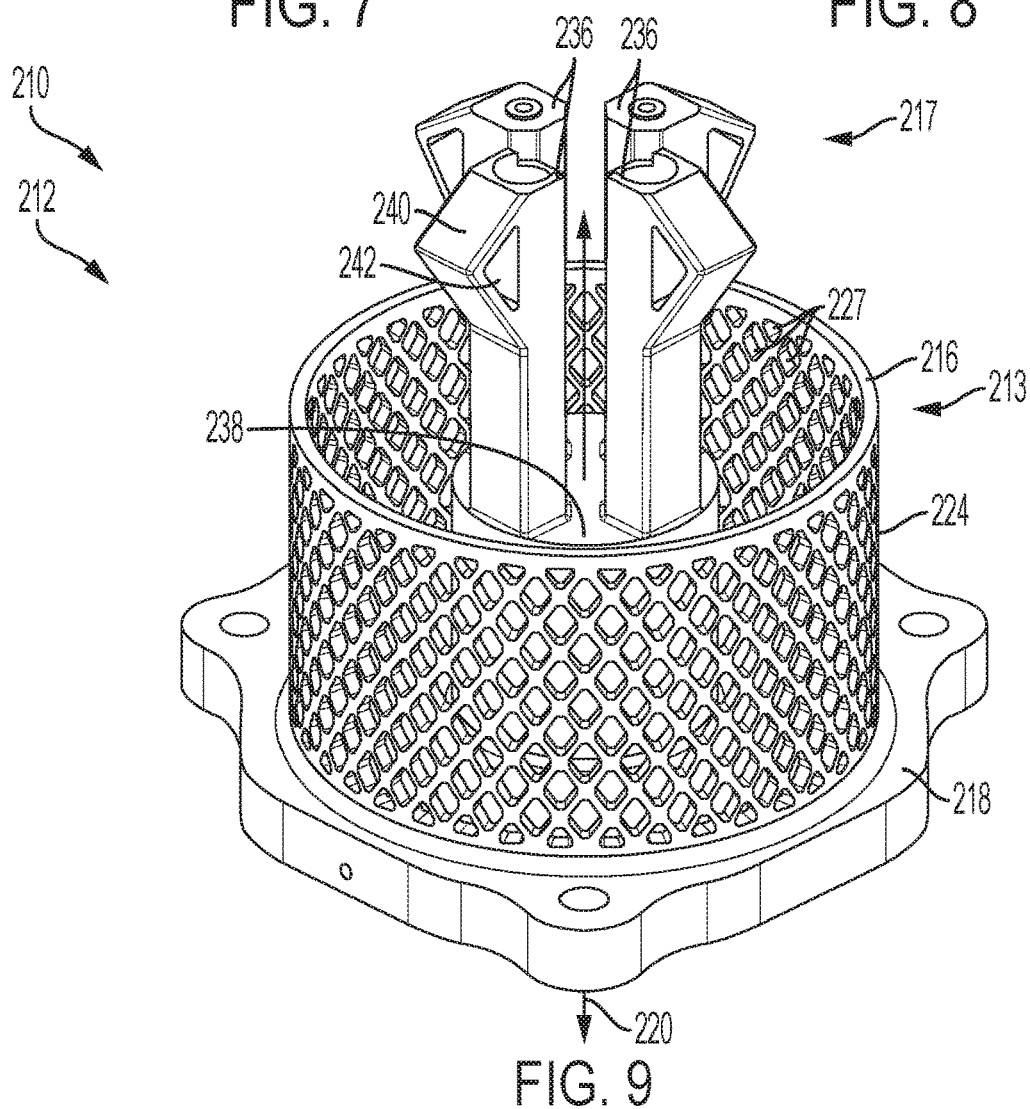
FIG. 9 is an isometric view of another illustrative additively manufactured cup dipole antenna in accordance with aspects of the present disclosure.

As shown in FIG. 9, this section describes an additively manufactured cup dipole antenna, generally indicated at 210. Antenna 210 includes an antenna framework 212, which is an example of additively manufactured antenna component 10, as described above. The cup dipole antenna may also be described as a turnstile antenna, or a crossed dipole antenna.

Antenna 210 is configured for radio communication within a frequency band. That is, the antenna is tuned to a range of radio frequencies. In the present example, antenna 210 is tuned to the S-band, which includes wavelengths between approximately 5.9 to 2.95 inches (15 to 7.5 centimeters).

Antenna framework 212 includes a cup 213 and an inner dipole structure 217, the cup including an outer wall 216 and a base 218. Wall 216 encloses a circular region of base 218, and cup 213 may form a circular radiating aperture for antenna 210. The cup may also be described as a tubular structure, and/or a hollow cylinder closed at one end. Base 218 may be shaped to facilitate connection of antenna 210 to a mounting structure.

Cup 213 may be approximately 4 inches in diameter, 4.5 inches in diameter, or between 3 and 5 inches in diameter. The cup may be approximately 2 inches in height, approximately 2.5 inches in height, or between 1 and 3 inches in height. An internal height of cup 213 may correspond to a selected wavelength. Dimensions of cup 213 may also be determined by desired functional properties of antenna 210.

Antenna framework 212 has a central axis 220, on which cup wall 216 and the enclosed circular portion of base 218 are centered. Central axis 220 may be described as determining a manufacturing orientation of antenna framework 212. When the antenna framework is manufactured, central axis 220 may be parallel to a vertical or z-axis of the manufacturing equipment. Antenna framework 212 may consequently comprise a plurality of planar layers that are perpendicular to central axis 220.

Cup wall 216 is formed entirely of a mesh 224, which includes a plurality of openings 227. The mesh may also be described as a lattice structure, a framework, and/or a plurality of openings in wall 216. Openings 227 include diamond shapes and half-diamond or triangular shapes. Mesh 224 is an example of mesh 14 as described above. Openings 227 are regularly spaced around wall 216 and oriented such that sides of the openings form an angle of no more than approximately 45 degrees with central axis 220. Openings 227 may also be described as defined between a plurality of intersecting linear structures, each linear structure forming an angle of no more than approximately 45 degrees with central axis 220.

A thickness of mesh 224, which may be also be referred to as thickness of wall 216, may be approximately 45 mils, may be between 40 and 50 mils, or may be between 20 and 60 mils. The diamond shapes and regular pattern of openings 227 may stiffen and reinforce the thin outer wall, improving structural strength. The shape and pattern of openings may also be configured to maintain the circular shape of cup 213 and thereby circularity of the aperture of antenna 210.

Openings 227 may be sized to ensure a negligible impact on the electrodynamic properties of the antenna. In other words, openings 227 may be sized small enough relative to expected wavelengths to avoid affecting antenna performance. In some examples, a maximum dimension of the openings may be selected such that changes to properties of the antenna such as gain are below a selected acceptable threshold.

Openings 227 may also be sized, shaped, spaced, and/or arranged according to structural requirements of antenna component 210. That is, openings 227 may be configured such that mesh 224 has sufficient structural strength, stiffness, or other desired structural properties.

Dipole structure 217 includes four poles 236 extending from a cylindrical support 238. The cylindrical support may include connection features not shown, to allow operative connection of a feed line to the antenna. Each pole 236 comprises a separate vertical support with a triangular projection 240 extending away from central axis 220. The lower or overhanging surface of each projection 240 forms an angle of approximately 45 degrees or less with respect to central axis 220. Dipole structure 217 may therefore be printed without use of secondary supports.

The four poles 236 include two pairs of poles, the poles of each pair having projections 240 extending in opposing parallel directions and the projections of each pair extending orthogonally relative to the other pair. Each pair of poles is configured to function as a dipole, such that dipole structure 217 functions as a crossed or turnstile dipole antenna.

Each triangular projection 240 includes a triangular opening 242. Similarly to projections 240, openings 242 are oriented such that no side of the opening forms an angle of greater than approximately 45 degrees with central axis 220. Together, openings 242 may be described as a mesh. Openings 242 may reduce material volume and/or weight of dipole structure 217 without significant effect on the electrodynamic properties of poles 236.

In the present example, openings 242 may be described as located outside a signal path or radio frequency path of antenna 210. The size and shape of the openings may therefore be constrained by structural properties of poles 236, but not by the wavelength of expected radio signals. In some examples, such as antenna 110, openings of the dipole structure may be disposed in the signal path and thereby constrained in size according to an expected wavelength.

Antenna framework 212 of antenna 210 is unitary. That is, the antenna framework is additively manufactured as a single piece, reducing overall assembly required for antenna 210. Single piece antenna framework 212 may also improve reliability of antenna 210 and/or reduce failure modes for the antenna.

The antenna framework is configured for manufacture without secondary supports. In other words, no support structures need to be removed after manufacture of the antenna. In particular, overhanging features of the antenna, including mesh 224 are designed at inclined angles in order to be self-supporting. The depicted example of antenna framework 212 requires limited post-processing in the form of machining detailed features such as fastener holes. The antenna may be configured such that surface roughness resulting from manufacture is limited sufficiently that overall surface finishing is not needed.

Antenna framework 212 may be configured for manufacture by Direct Metal Laser Sintering (DMLS). The antenna comprises a sintered aluminum alloy, specifically AlSi10Mg Type II in the present example. The alloy may provide good strength, hardness, and high load tolerance, along with low weight. Any metal or alloy of similarly appropriate properties may be used, in any effective additive manufacturing process.

C. Illustrative Method of Additive Manufacture

Figure 10:
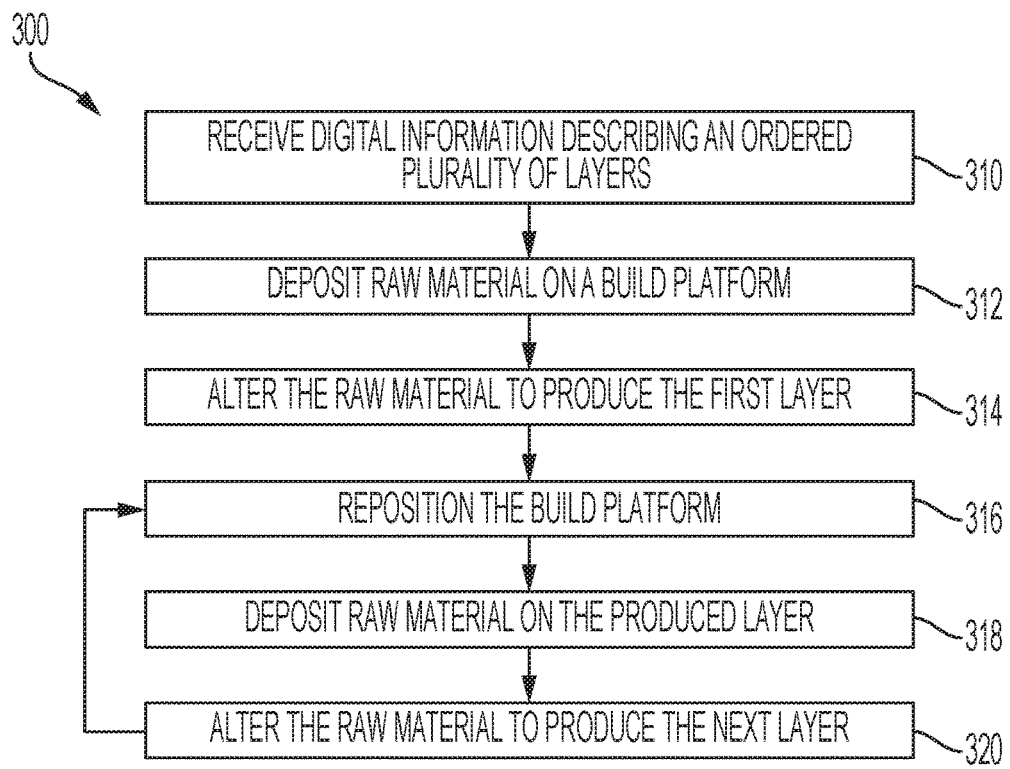
FIG. 10 is a flow chart depicting steps of an illustrative method of additive manufacture according to the present teachings.

This section describes steps of an illustrative method for additive manufacture of a workpiece; see FIG. 10. Aspects of an illustrative additive manufacturing device depicted in FIG. 11 may be utilized in the method steps described below. Where appropriate, reference may be made to components and systems that may be used in carrying out each step. These references are for illustration, and are not intended to limit the possible ways of carrying out any particular step of the method.

FIG. 10 is a flowchart illustrating steps performed in an illustrative method, and may not recite the complete process or all steps of the method. Although various steps of method 300 are described below and depicted in FIG. 10, the steps need not necessarily all be performed, and in some cases may be performed simultaneously or in a different order than the order shown.

Figure 11:
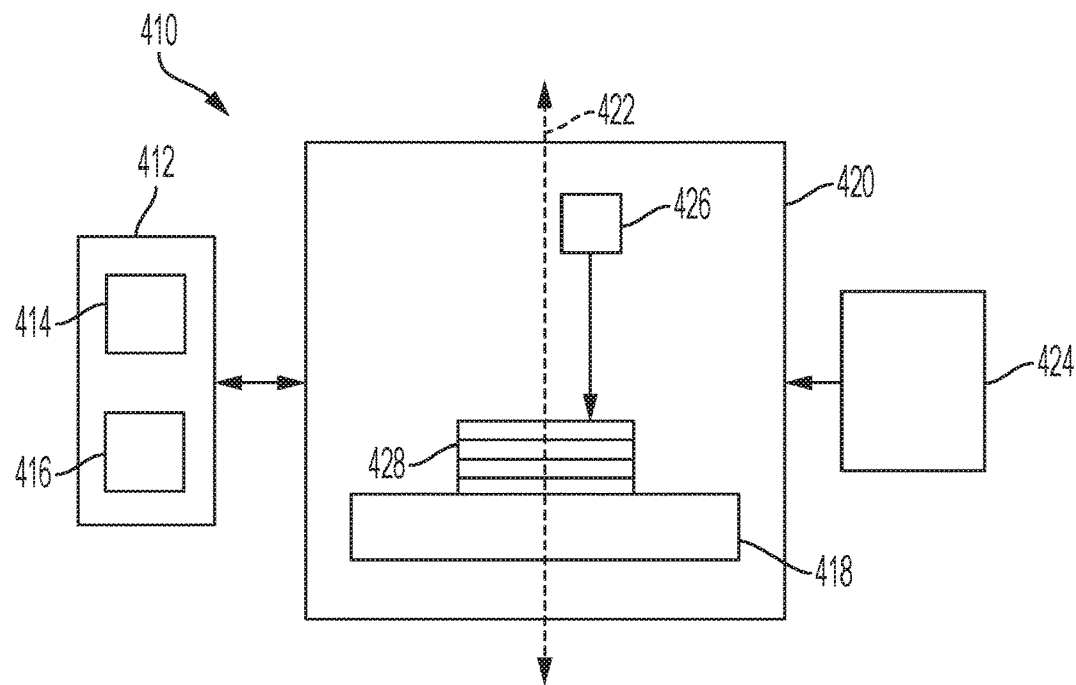
FIG. 11 is a schematic diagram of an illustrative additive manufacturing apparatus as described herein.

At step 310, digital information describing an ordered plurality of layers is received. The digital information may be received by a computer controller 412 of an additive manufacturing device 410 as depicted in FIG. 11. The additive manufacturing device may also be referred to as a printer, or a fabricator. Computer controller 412 may comprise any data processing system configured to receive digital design information and control functions of printer 410. The illustrative computer controller shown in FIG. 11 includes a processor 414 for controlling printer functions and memory 416 for storing received data.

The received information may include geometric data and/or design details for a plurality of two-dimensional patterns that constitute layers of a three-dimensional object, where the three-dimensional object is a workpiece 428 to be manufactured. For example, workpiece 428 may be a cup dipole antenna as described above. The layers may also be described as cross-sections or slices. The plurality of layers is ordered, such that the layers may be numbered or organized from a first layer to a last layer.

Step 312 of method 300 includes depositing raw material on a build platform 418 located in a building environment 420 of printer 410. The build platform may comprise a support moveable by computer controller 412 along a manufacturing axis 422. The build platform may have a planar surface perpendicular to manufacturing axis 422.

The raw material may be any material appropriate to additive manufacturing, typically a fluid or powder and including but not limited to photopolymer resin, thermoplastic, plaster, ceramic, and metal. For an antenna as previously described, the raw material may be an aluminum alloy powder. The material may be distributed from a raw material source 424 such as a hopper, a tank, or a powder bed. For example, the aluminum alloy powder may be swept from a powder bed over build platform 418 by a brush arm actuated by computer controller 412.

The raw material may be distributed evenly over build platform 418, or may be deposited in a selected pattern. Depositing may be done under control of computer controller 412. In some examples, build platform 418 may be submerged in raw material and depositing may be accomplished by gravity or fluid pressure. In some examples, a print head 426 connected to raw material source 424 may deposit the raw material in a pattern corresponding to the first layer of the ordered plurality of layers.

At step 314, the raw material is altered to produce the first layer. In other words, a physical change is induced the deposited material, according to the design information describing the first layer of the ordered plurality of layers and as directed by the computer controller 412, to realize the first layer as a physical object on the build platform.

The material may be acted on by a print head 426 of printer 410, controlled by computer controller 412. For example, the print head may include a laser that cures a photopolymer by exposure to light. For the antennas as described above, print head 426 may comprise a laser that sinters a metal alloy powder by exposure to heat. The print head may be directed by computer controller 412 to follow a path delineated in the received digital information for the first layer, and/or a path calculated by processor 414 based on the received digital information.

Step 316 includes repositioning the build platform. In some examples, build platform 418 may start a selected distance from print head 426. The selected distance may be determined by the procedures performed by the print head. Subsequent to production of a layer, the build platform may be repositioned by computer controller 412 along manufacturing axis 422 away from print head 426 by the layer's thickness. That is, the build platform may be moved such that a top surface of the produced layer is the selected distance from print head 426.

In some examples, build platform 418 may start in alignment with another element of printer 410 such as a raw material distribution component. Subsequent to production of a layer, the build platform may be repositioned by computer controller 412 along manufacturing axis 422 such that a top surface of the produced layer is aligned with the other element of printer 410. In some examples, at step 316 print head 426 may be repositioned instead of or in addition to build platform 418. In some examples, step 316 may be skipped.

At step 318, raw material is deposited on the layer produced in the preceding step of method 300. As described for step 312, the raw material may be any appropriate material and may be deposited in any appropriate manner. At step 320, the raw material is altered to produce the next layer as previously described for step 314.

Steps 316 through 320 may be repeated to produce each layer of the plurality of layers of the received digital information, until the last layer is produced. The produced first through last layers may then comprise workpiece 428 as described in the received digital information. The workpiece may be removed from the printer and post-processed as desired. For example, an antenna as described above may be machined or wire cut from a build plate of the build platform, and then fine details or smooth surfaces of the antenna may be further finished by machining or other methods.

D. Illustrative Method

Figure 12:
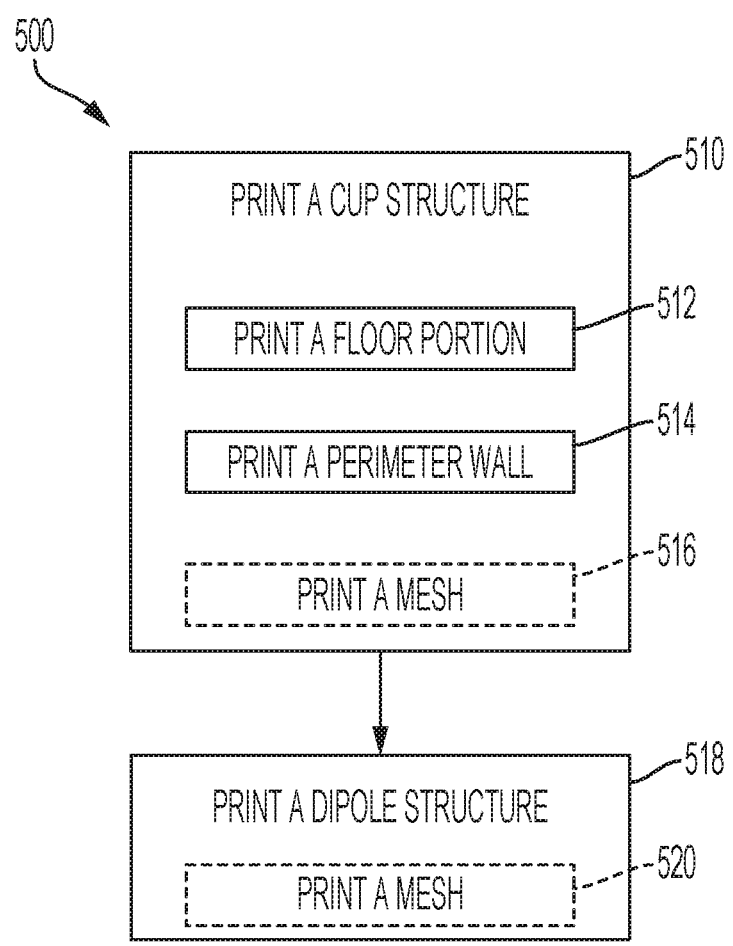
FIG. 12 is a flow chart depicting steps of an illustrative method of additively manufacturing an antenna according to the present teachings.

This section describes steps of an illustrative method for manufacturing an antenna; see FIG. 12. Aspects of antenna components, additive manufacturing methods, or additive manufacturing devices previously described may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. Although various steps of method 500 are described below and depicted in FIG. 12, the steps need not necessarily all be performed, and in some cases may be performed simultaneously or in a different order than the order shown.

At step 510, the method includes printing a cup structure. Printing may include additive manufacture according to any appropriate method, including but not limited to illustrative method 300 described above. Substep 512 of step 510 includes printing a floor portion of the cup structure, which may also be described as a base or reflector. The floor portion may be circular and/or may be configured for mounting of the completed antenna. A build axis or orientation of the printing process may be perpendicular to a planar extent of the floor portion. In some examples, the floor portion may be printed directly onto a build plate or support platform of an additive manufacturing apparatus.

Substep 514 of step 510 includes printing a perimeter wall of the cup structure. The wall may extend up from the floor portion and may enclose an area of the floor portion. The wall may be disposed along a perimeter of the floor portion, and/or the floor portion may extend beyond the wall. The wall may be circular or cylindrical, about an axis perpendicular to the floor portion. A build axis or orientation of the printing process may be parallel to a central axis of the wall, and the wall may be printed as a unitary structure with the floor portion.

Optional substep 516 of step 510 includes printing a mesh. The mesh may comprise some or all of the perimeter wall of the cup structure. In some examples, the mesh may also comprise some or all of the floor portion. The mesh may be described as a plurality of openings or apertures and/or as a wall structure having a plurality of openings or apertures. The openings of the mesh may be arranged in a regular, repeating pattern. The openings may have a diamond and/or triangular shape and may be oriented such that no side of an opening forms an angle of more than approximately 45 or 50 degrees with the build axis of the printing process.

The openings of the mesh may be sized according to an expected range of radio frequencies. That is, the openings may be smaller than a selected fraction of a smallest wavelength of expected radio frequency transmission or reception. The openings may be small enough to avoid significant effect on transmission or reception of the antenna.

Step 518 of method 500 includes printing a dipole structure. The dipole structure may extend from a region of the floor portion proximate the central axis of the perimeter wall and/or from a central region of the floor portion. The dipole structure may be configured to function as a dipole antenna, such as a bow-tie antenna, a crossed dipole, or a halo antenna. The dipole structure may include one or more dipoles of any effective shape or configuration, and may include a feed structure such as a balun.

Optional substep 520 of step 518 includes printing a mesh. The mesh may comprise some or all of the dipole structures. For example, the mesh may comprise a portion of each pole of the dipole structure. The mesh may be described as a plurality of openings or apertures and/or as a planar structure having a plurality of openings or apertures. The openings of the mesh may be arranged in a regular, repeating pattern. In some examples, the mesh may comprise a single opening in each pole of the dipole structure.

The openings may have a diamond and/or triangular shape and may be oriented such that no side of an opening forms an angle of more than approximately 45 or 50 degrees with the build axis of the printing process. The openings of the mesh may be sized according to an expected range of radio frequencies. That is, the openings may be smaller than a selected fraction of a smallest wavelength of expected radio frequency transmission or reception. The openings may be sufficiently small enough to avoid significant effect on transmission or reception of the antenna.

Method 500 may include either optional substep 516 or optional substep 520, or both, but may include printing at least one mesh. In some examples, the method may further include post-processing of the printed cup and/or dipole structures.

ILLUSTRATIVE COMBINATIONS AND ADDITIONAL EXAMPLES

This section describes additional aspects and features of antenna devices and components, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An antenna device comprising:
a cavity structure having a floor portion and a perimeter wall portion connected to the floor portion,
a dipole structure extending upward from a center region of the floor portion inside the cavity structure, wherein at least one of the wall portion and the dipole structure has an opening small enough relative to an expected radio frequency wavelength to avoid affecting antenna performance.

A1. The antenna device of A0, wherein the cavity structure and the dipole structure are made by additive manufacturing.

A2. The antenna device of A0 or A1, wherein the wall portion is circular.

A3. The antenna device of any of A0-A2, wherein the opening is diamond shaped.

A4. The antenna device of any of A0-A3, wherein the wall portion or the dipole structure includes a mesh.

A5. The antenna device of A4, wherein the mesh has diamond shaped openings.

A6. The antenna device of any of A0-A5, wherein substantially the entire wall portion is formed of a printed mesh.

A7. The antenna device of any of A0-A6, wherein the dipole structure has a triangular shaped opening.

A8. The antenna device of any of A0-A7, wherein the opening has a maximum dimension of less than 10 percent of the expected wavelength.

A9. The antenna device of any of A0-A8, wherein the cavity structure is comprised of laser sintered metal alloy.

A10. The antenna device of any of A0-A9, wherein the antenna device is configured for operation in the L-band of radio frequencies and the opening has a maximum dimension of approximately half an inch.

A11. The antenna device of any of A0-A9, wherein the antenna device is configured for operation in the L-band of radio frequencies and the opening has a maximum dimension of approximately one quarter of an inch or less.

A12. The antenna device of any of A0-A9, wherein the antenna device is configured for operation in the S-band of radio frequencies and the opening has a maximum dimension of approximately one quarter of an inch.

A11. The antenna device of any of A0-A9, wherein the antenna device is configured for operation in the S-band of radio frequencies and the opening has a maximum dimension of approximately one eighth of an inch or less.

B0. An antenna device, comprising:
an additively manufactured cup structure having a floor portion and a perimeter wall portion connected to the floor portion,
an additively manufactured dipole structure extending upward from the floor portion, wherein at least one of the wall portion and the dipole structure include an additively manufactured mesh.

B1. The antenna device of B0, wherein the mesh includes openings, each opening having a maximum dimension of less than 10 percent of the expected wavelength.

B2. The antenna device of B0 or B1, wherein the cup structure is comprised of laser sintered metal alloy.

B3. The antenna device of any of B0-B2, wherein the mesh includes an array of diamond shaped openings.

B4. The antenna device of any of B0-B3, wherein the mesh has a thickness of between 20 mils to 120 mils.

B5. The antenna device of any of B0-B4, wherein the mesh has diamond shaped openings.

B6. The antenna device of any of B0-B5, wherein the mesh includes openings, each opening having a maximum dimension sufficiently small relative to an expected radio frequency wavelength to avoid affecting antenna performance.

B7. The antenna device of B6, wherein the maximum dimension is between approximately one eighth of an inch and half an inch.

B8. The antenna device of any of B0-B7, wherein the antenna is configured for operation in the L-band of radio frequencies.

B9. The antenna device of any of B0-B8, wherein the antenna is configured for operation in the S-band of radio frequencies.

C0. A method of manufacturing a cavity antenna, comprising:
printing a cavity structure having a floor portion and a perimeter wall portion, and
printing a dipole structure inside the cavity structure, wherein at least one of the cavity structure and the dipole structure includes a mesh.

C1. The method of C0, wherein the mesh has openings small enough to avoid significant effect on radio frequency transmission or reception.

C2. The method of C0 or C1, wherein substantially the entire perimeter wall portion is made of mesh.

C3. The method of any of C0-C2, wherein the mesh has diamond shaped openings.

C4. The method of any of C0-C3, wherein each of the perimeter wall portion and the dipole structure includes a mesh.

D0. An antenna component, comprising:
a hollow body portion comprised of laser sintered metal alloy, configured to direct radio frequency signals, the body portion including a mesh configured to avoid secondary printing support requirements, and including openings small enough to avoid affecting radio frequency transmission or reception.

D1. The antenna component of D0, wherein the body portion forms part of a command horn antenna.

D2. The antenna component of D0, wherein the body portion forms part of a cavity antenna.

D3. The antenna component of D2, wherein the body portion forms part of a cup-dipole antenna.

Advantages, Features, and Benefits

The different examples of the additively manufactured antenna components described herein provide several advantages over known solutions for antenna design. For instance, illustrative examples described herein allow manufacture of an antenna with reduced manual assembly.

Additionally, and among other benefits, illustrative examples described herein reduce weight, material requirements, and print time.

Additionally, and among other benefits, illustrative examples described herein allow additive manufacture of accurately circular apertures.

Additionally, and among other benefits, illustrative examples described herein allow a geometrically precise antenna to be repeatably additively manufactured.

Additionally, and among other benefits, illustrative examples described herein may have decreased susceptibility to acoustic effects.

Additionally, and among other benefits, illustrative examples described herein may have improved operational reliability.

No known system or device can perform these functions, particularly without need for secondary supports in the additive manufacturing process. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. An antenna device comprising:
a cavity structure having a floor portion and a perimeter wall portion connected to the floor portion, and
a dipole structure extending upward from a center region of the floor portion inside the cavity structure, wherein the cavity structure and dipole structure are additively manufactured along a build axis perpendicular to the floor portion of the cavity structure, wherein the wall portion includes a mesh having diamond shaped openings small enough relative to an expected radio frequency wavelength to avoid affecting antenna performance, each side of each diamond shaped opening forming an angle of less than approximately 50 degrees with the build axis, and wherein the mesh of the wall portion is additively manufactured without secondary supports, and the dipole structure includes a planar pole perpendicular to the floor portion of the cavity structure.

2. The antenna device of claim 1, wherein the wall portion is circular.

3. The antenna device of claim 1, wherein substantially the entire wall portion is formed of a printed mesh.

4. The antenna device of claim 1, wherein the dipole structure has a triangular shaped opening.

5. An antenna device, comprising:

an additively manufactured cup structure having a floor portion and a perimeter wall portion connected to the floor portion, and an additively manufactured dipole structure extending upward from the floor portion, wherein the wall portion includes an additively manufactured mesh, and the dipole structure has four poles, each pole including a separate vertical support with a triangular projection extending away from a central axis of the antenna device, wherein the cup structure and the dipole structure are additively manufactured as a single piece.

6. The antenna device of claim 5, wherein the mesh includes openings, each opening having a maximum dimension sufficiently small relative to an expected radio frequency wavelength to avoid affecting antenna performance.

7. The antenna device of claim 5, wherein the cup structure is comprised of laser sintered metal alloy.

8. The antenna device of claim 5, wherein the mesh includes diamond shaped openings.

9. The antenna device of claim 8, wherein the mesh includes an array of diamond shaped openings.

10. A method of manufacturing a cavity antenna, comprising:

printing a cavity structure having a floor portion and a perimeter wall portion along a build axis perpendicular to the floor portion, and printing a dipole structure inside the cavity structure, wherein the cavity structure includes a mesh having diamond shaped openings, each side of each diamond shaped opening forming an angle of less than approximately 50 degrees with the build axis, and the dipole structure includes a planar pole perpendicular to the floor portion of the cavity structure.

11. The method of claim 10, wherein printing the cavity structure comprises:

printing the floor portion of the cavity structure; and printing the perimeter wall of the cavity structure to extend up from the floor portion and enclose an area of the floor portion.

12. The method of claim 10, wherein printing the cavity structure comprises printing the mesh to comprise at least some of the perimeter wall and/or some of the floor portion.

13. The method of claim 10, wherein printing the dipole structure comprises printing a mesh to comprise some or all of the dipole structure.

14. The method of claim 10, wherein printing the dipole structure comprises printing a single opening in each pole of the dipole structure.

15. The antenna device of claim 1, wherein the cavity structure and dipole structure are additively manufactured as a single piece.

16. The antenna device of claim 1, wherein the planar pole is parallel the build axis.

17. The antenna device of claim 1, wherein the dipole structure includes multiple poles, each having a lower edge surface forming an angle of approximately 45 degrees or less with the build axis.

18. The antenna device of claim 1, wherein the dipole structure includes multiple poles, each pole including a mesh, the meshes of the poles including openings smaller than the diamond shaped openings of the mesh of the wall portion.

19. The antenna device of claim 1, wherein the planar pole includes a mesh having openings smaller than the diamond shaped openings of the mesh of the wall portion.

20. The antenna device of claim 5, wherein a thickness of the additively manufactured mesh is between 20 mils and 60 mils.

* * * * *